US008275410B2

(12) United States Patent
Matsumoto

(10) Patent No.: US 8,275,410 B2
(45) Date of Patent: Sep. 25, 2012

(54) RADIO COMMUNICATION TERMINAL

(75) Inventor: Hiroyuki Matsumoto, Yokohama (JP)

(73) Assignee: Kyocera Corporation, Kyoto (JP)

( * ) Notice: Subject to any disclaimer, the term of this patent is extended or adjusted under 35 U.S.C. 154(b) by 442 days.

(21) Appl. No.: 12/517,034

(22) PCT Filed: Nov. 28, 2007

(86) PCT No.: PCT/JP2007/072986
§ 371 (c)(1),
(2), (4) Date: May 29, 2009

(87) PCT Pub. No.: WO2008/069079
PCT Pub. Date: Jun. 12, 2008

(65) Prior Publication Data
US 2010/0048238 A1 Feb. 25, 2010

(30) Foreign Application Priority Data
Nov. 29, 2006 (JP) .................. 2006-322676

(51) Int. Cl.
*H04M 1/00* (2006.01)
(52) U.S. Cl. .................. 455/552.1; 455/432.1; 455/433
(58) Field of Classification Search .................. 455/552, 455/432.1, 418, 419, 433; 709/221; 370/331, 370/333, 352, 335, 342
See application file for complete search history.

(56) References Cited

U.S. PATENT DOCUMENTS

| 5,881,235 | A * | 3/1999 | Mills ............................ 709/221 |
| 7,155,219 | B2 | 12/2006 | Aerrabotu |
| 2004/0198350 | A1 | 10/2004 | Aerrabotu |
| 2004/0203747 | A1 | 10/2004 | Uchida ........................ 455/432.1 |
| 2005/0075129 | A1* | 4/2005 | Kuchibhotla et al. ...... 455/552.1 |
| 2005/0249171 | A1* | 11/2005 | Buckley et al. ................ 370/338 |
| 2006/0083199 | A1* | 4/2006 | Yang ............................ 370/331 |
| 2006/0094423 | A1* | 5/2006 | Sharma et al. ................ 455/433 |
| 2006/0199580 | A1* | 9/2006 | Zhang ........................ 455/432.1 |
| 2006/0268840 | A1* | 11/2006 | Xu et al. ........................ 370/352 |
| 2007/0214344 | A1 | 9/2007 | Helvick .......................... 713/1 |
| 2007/0254646 | A1* | 11/2007 | Sokondar ................... 455/432.1 |

(Continued)

FOREIGN PATENT DOCUMENTS
JP 2005-529564 9/2005
(Continued)

OTHER PUBLICATIONS

3rd Generation Partnership Project 2, "IP Based Over-the-Air Device Management (IOTA-DM) for cdma2000 Systems 3GPP2 C.S0064-0, Version 1.0" 3GGP2, Sep. 2005.

(Continued)

*Primary Examiner* — Lana N Le
*Assistant Examiner* — Golam Sorowar
(74) *Attorney, Agent, or Firm* — DLA Piper LLP (US)

(57) ABSTRACT

A radio communication terminal 100 includes: a first storage unit, 117₁ configured to store a PRL list L1 used for connection to a communication provider—provided WLAN provided by a communication provider, a content of the first storage unit 117₁ being rewritable by the communication provider; and a second storage unit 117₂ configured to store a user registration list L2 used for connection to a user-registered WLAN registered by a user of the radio communication terminal, the second storage unit 117₂ being rewritable by the user. The radio communication terminal 100 selects any one of the communication provider-provided WLAN and the user-registered WLAN, based on the PRL list L1 and the user registration list L2.

4 Claims, 5 Drawing Sheets

U.S. PATENT DOCUMENTS

2008/0064393 A1  3/2008  Oommen et al. .......... 455/432.1

FOREIGN PATENT DOCUMENTS

| JP | 2005-532011 | 10/2005 |
| JP | 2007-028479 | 2/2007 |
| JP | 2007-241989 | 9/2007 |
| WO | WO 03/105512 A1 | 12/2003 |
| WO | WO 2004/034623 A2 | 4/2004 |
| WO | WO 2005/117463 A2 | 12/2005 |

OTHER PUBLICATIONS

Japanese language office action dated Jul. 3, 2012 and its English language translation issued in corresponding Japanese application 2006322676.

* cited by examiner

FIG. 5
(a)
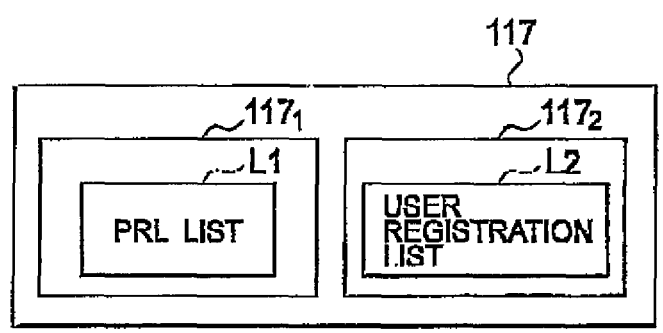
(b)
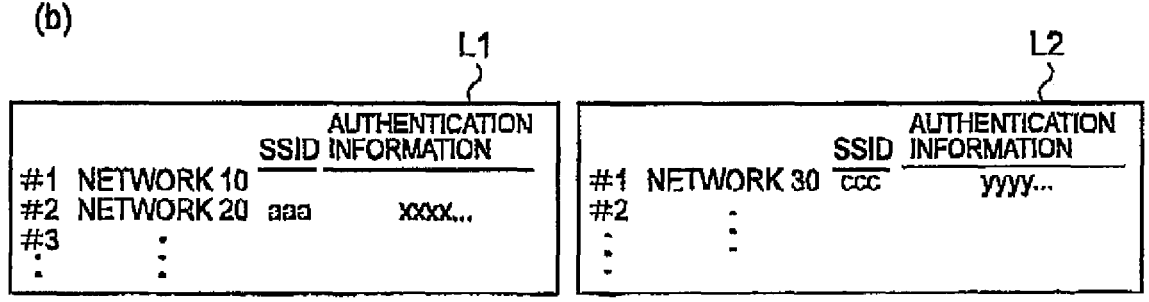

RADIO COMMUNICATION TERMINAL

CROSS-REFERENCE TO THE RELATED APPLICATIONS

This application is a national stage of international application No. PCT/JP2007/072986 filed on Nov. 28, 2007, which also claims the benefit of priority under 35 USC 119 to Japanese Patent Application No. 2006-322676 filed on Nov. 29, 2006, the entire contents of which are incorporated herein by reference.

TECHNICAL FIELD

The present invention relates to a radio communication terminal capable of selectively using multiple radio communication networks depending on a requirement.

BACKGROUND ART

Along with the recent development of radio communication techniques, an environment is being created in which, depending on a requirement (e.g., communication speed), a radio communication terminal selectively uses multiple radio communication networks (e.g., a mobile communication network and a wireless LAN). To this end, a method of having a radio communication terminal include a so-called roaming function for selectively using multiple radio communication networks is known (for example, see Patent Document 1).

A radio communication terminal has a storage unit for storing connection information, or more specifically, a preferred roaming list (PRL), which includes information on each of the radio communication networks, such as their identification information, priorities, regions, and frequencies used. The storage unit is configured by a flash memory or the like. Based on the contents of the PRL, the radio communication terminal selects an appropriate radio communication network.

In general, the contents of the PRL are rewritable only by a communication provider (e.g., a communication provider providing the radio communication terminal). In addition, the user of the radio communication terminal can add information (e.g., an SSID) to the PRL, the information needed for selecting a radio communication network (e.g., a public wireless LAN) provided by other than the communication provider.

Non-patent Document 1: "IP Based Over-the-Air Device Management (TOTA-DM) for cdma2000 Systems 3GPP2 c.s0064-O Version 1.0," 3GPP2, September 2005

DISCLOSURE OF THE INVENTION

However, the conventional radio communication terminal described above has the following problem. Specifically, there is a case where a communication provider rewrites the PRL after a user of the radio communication terminal adds information on a network for use, such as a public wireless LAN, to the PRL. In this case, the rewrite deletes the information on the network, such as the public wireless LAN, added by the user. This causes a problem that the user of the radio communication terminal has to add the information on the network for use, such as the public wireless LAN, to the PRL again.

The present invention has been made in consideration of such situation, and has an objective to provide a radio communication terminal capable of efficiently managing connection information (PRL) on a radio communication network provided by a communication provider and information on a radio communication network added by a user.

The present invention has the following characteristics to solve the problems described above. The first characteristic of the present invention a radio communication terminal (radio communication terminal 100) capable of selectively using a plurality of radio communication networks (radio communication network 10,20,21), depending on a requirement (e.g., communication speed). The radio communication terminal comprising: a first storage unit (storage unit 117$_1$) configured to store first connection information (PRL list L1) used for connection to a communication provider-provided network (radio communication network 20) being one of the radio communication networks provided by a communication provider (communication provider OP), a content of the first storage unit being rewritable by the communication provider; a second storage unit (storage unit 117$_2$) configured to store second connection information (user registration list L2) used for connection to a user-registered network (radio communication network 21) being one of the radio communication networks provided by other than the communication provider and registered by a user of the radio communication terminal, the second storage unit being rewritable by the user; and a network controller (CPU120) configured to select any one of the communication provider-provided network and the user-registered network based on the first connection information stored in the first storage unit, and the second connection information stored in the second storage unit.

According to the radio communication terminal, the first connection information used for connection to the communication provider-provided communication provider-provided network provided by the communication provider is stored in the first storage unit, the contents of which is rewritable by the communication provider. On the other hand, the second connection information used for connection to the user-registered network registered by a user of the radio communication terminal is stored in the second storage unit, which is rewritable by the user.

Accordingly, even if the contents of the first connection information are rewrote by the communication provider, the contents of the second connection information used for connection to the user-registered network registered by the user of the radio communication terminal are not deleted. Therefore, the radio communication terminal allows efficient management of the connection information (PRL) on the radio communication network provided by the communication provider and the connection information on the radio communication network added by the user.

A second characteristic thereof is characterized in that, in the radio communication terminal according to the first characteristic, the communication provider further provides a communication provider-provided line switching network (radio communication network 10) being a line switching radio communication network used for a voice call, the communication provider-provided network notifies the radio communication terminal of reception of the voice call for the radio communication terminal, and the network controller selects the communication provider-provided network in priority to the user-registered network.

A third characteristic thereof is characterized in that, in the radio communication terminal according to any one of the first and second characteristic, the network controller performs processing for connection to the communication provider-provided network, based on the first connection information stored in the first storage unit.

A fourth characteristic thereof is characterized in that, in the radio communication terminal according to the third characteristic, when determined that the radio communication terminal is not connectable to the communication provider-provided network, the network controller performs processing for connection to the user-registered network.

A fifth characteristic thereof is characterized in that, in the radio communication terminal according to any one of the third and fourth characteristic, when determined that the radio communication terminal is not connectable to the communication provider-provided network, the network controller performs processing for connection to the communication provider provided line switching network.

A sixth characteristic thereof is characterized in that, in the radio communication terminal according to the fourth characteristic, the network controller performs the processing for connection to the communication provider-provided network at a predetermined cycle (e.g., per 10 seconds), and when determined that the radio communication terminal is connectable to the communication provider-provided network, the network controller stops the processing for connection to the user-registered network.

A seventh characteristic thereof is characterized in that, in the radio communication terminal according to the fifth characteristic, the network controller performs the processing for connection to the communication provider-provided network at a predetermined cycle, and when determined that the radio communication terminal is connectable to the communication provider-provided network, the network controller stops the processing for connection to the communication provider-provided line switching network.

Provided according to the characteristics of the present invention is a radio communication terminal capable of efficiently managing connection information (PRL) on a radio communication network provided by a communication provider and information on a radio communication network added by a user.

BRIEF DESCRIPTION OF THE DRAWINGS

FIG. 1 is a diagram showing the overall schematic configuration of a communication system according to an embodiment of the present invention.

FIG. 2 is a diagram showing the block configuration of a radio communication terminal according to the embodiment of the present invention.

FIG. 3 is a diagram showing an operation example of how the radio communication terminal according to the embodiment of the present invention selects a radio communication network.

FIG. 4 is a diagram showing another operation example of how the radio communication terminal according to the embodiment of the present invention selects a radio communication network.

[FIG. 5] FIG. 5 is a diagram showing an example of a PRL list (first connection information) and an example of a user registration list (second connection information) which are stored in respective storage units of the radio communication terminal according to the embodiment of the present invention.

BEST MODE FOR CARRYING OUT THE INVENTION

Figure 1:
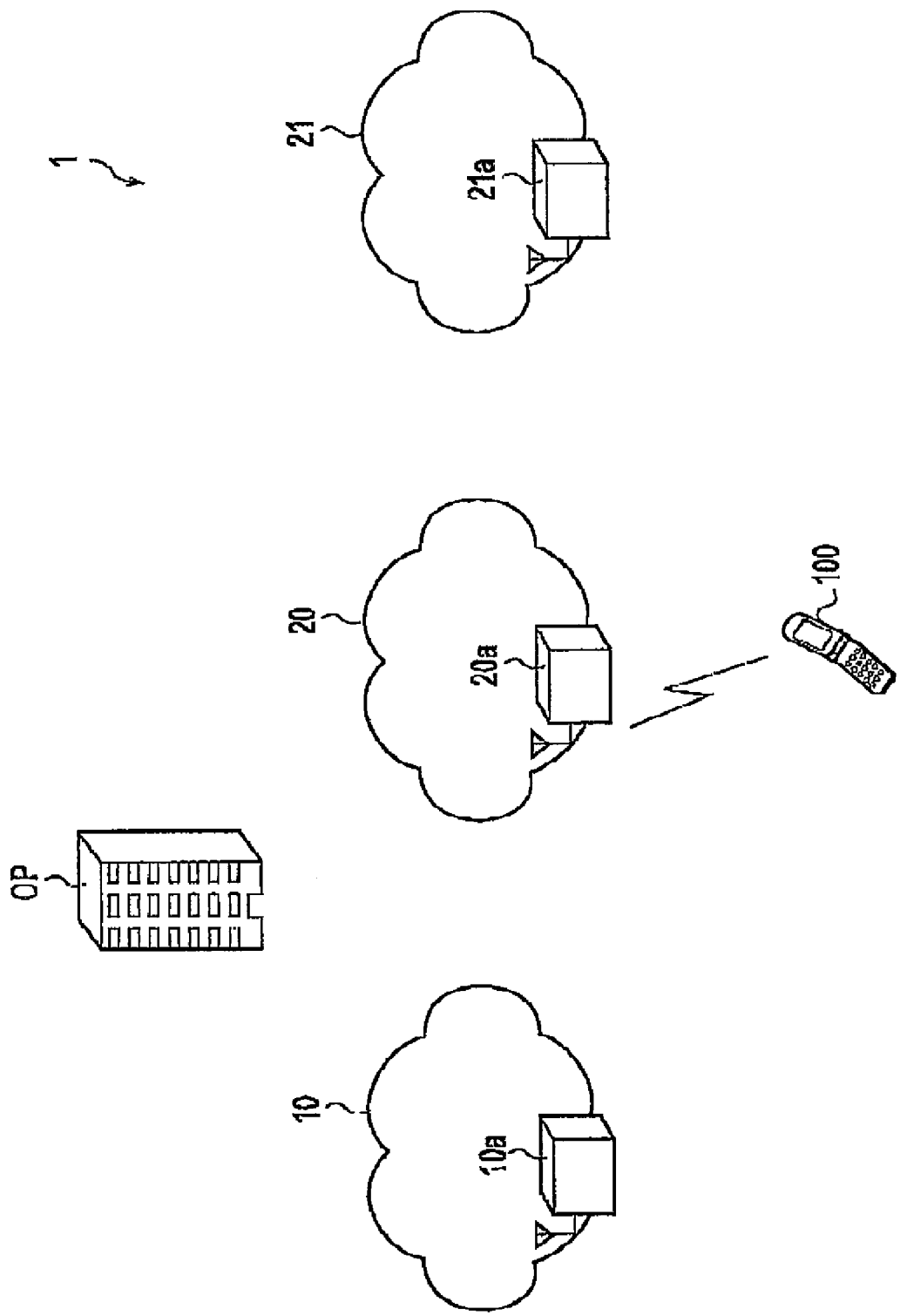
[FIG. 1]

Next, an embodiment of the present invention will be described. Throughout the drawings, the same or like parts bear the same or like reference numerals. It should be noted, however, that the drawings are schematic, and that the dimensional proportions and the like are different from their actual values.

Accordingly, specific dimensions and the like should be inferred based on the description given below. Moreover, dimensional relationships and dimensional proportions may differ from one drawing to another in some parts, of course.

(Overall Schematic Configuration of the Communication System)

FIG. 1 is a diagram showing the overall schematic configuration of a communication system 1 according to the present embodiment. As FIG. 1 shows, the communication system 1 includes a radio communication network 10, a radio communication network 20, and a radio communication network 21. The communication system 1 also includes a radio communication terminal 100. Note that the number of radio communication networks configuring the communication system 1 and the number of radio communication terminals 100 included in the communication system 1 are not limited to the numbers shown in FIG. 1.

The radio communication network 10 is a line switching radio communication network conforming to a CDMA scheme, or more specifically, to a cdma2000 1× scheme. The radio communication network 10 includes a radio base station 10a that performs radio communication with the radio communication terminal 100.

The radio communication network 20 is a radio communication network conforming to a wireless LAN scheme such as IEEE802.11g. The radio communication network 20 includes a radio based station 20a that performs radio communication with the radio communication terminal 100.

The radio communication network 10 and the radio communication network 20 are provided by a communication provider OP. Specifically, the communication provider OP operates the radio communication network 10 and the radio communication network 20 and provides communication services, such as voice communications and packet communications, through them. The radio communication network 10 is used for voice communications. The radio communication network 20 is used for voice communications (IP phone) and packet communications.

In the present embodiment, the radio communication network 10 constitutes a communication provider-provided line switching network, and the radio communication network 20 constitutes a communication provider-provided network.

In the present embodiment, the radio communication network 20 is capable of notifying the radio communication terminal 100 of reception of a voice call for the radio communication terminal 100. Accordingly, the radio communication terminal 100 can be notified of reception of a voice call for the radio communication terminal 100 via the radio communication network 10 and the radio communication network 20.

The radio communication network 21 is a radio communication network conforming to a wireless LAN scheme such as IEEE802.11g. The radio communication network 21 includes a radio base station 21a that performs radio communication with the radio communication terminal 100.

The radio communication network 21 is provided by other than the communication provider OP. In the present embodiment, the radio communication network 21 is a public wireless LAN for use in a store or elsewhere, which is provided by other than the communication provider OP. Note that the radio communication network 21 may be a wireless LAN set up in the house or the like of a user of the radio communication terminal 100.

Information used for connection to the radio communication network 21, or specifically, contents of a user registration list L2 are registered by the user of the radio communication terminal 100 (see FIG. 5(b)). In the present embodiment, the radio communication network 21 constitutes a user-registered network.

The radio communication terminal 100 is capable of selectively using a network, among the radio communication network 10, the radio communication network 20, and the radio communication network 21, depending on a requirement (e.g., communication speed). Specifically, the radio communication terminal 100 selects any of the radio communication network 10, the radio communication network 20, and the radio communication network 21, based on the contents of a PRL list L1 or the contents of the user registration list L2 (sec FIG. 5(b)), both of the lists being stored in a memory 117 (see FIG. 2). Note that how the radio communication terminal 100 selects among the radio communication networks is described later.

(Block Configuration of the Radio Communication Terminal)

Figure 2:
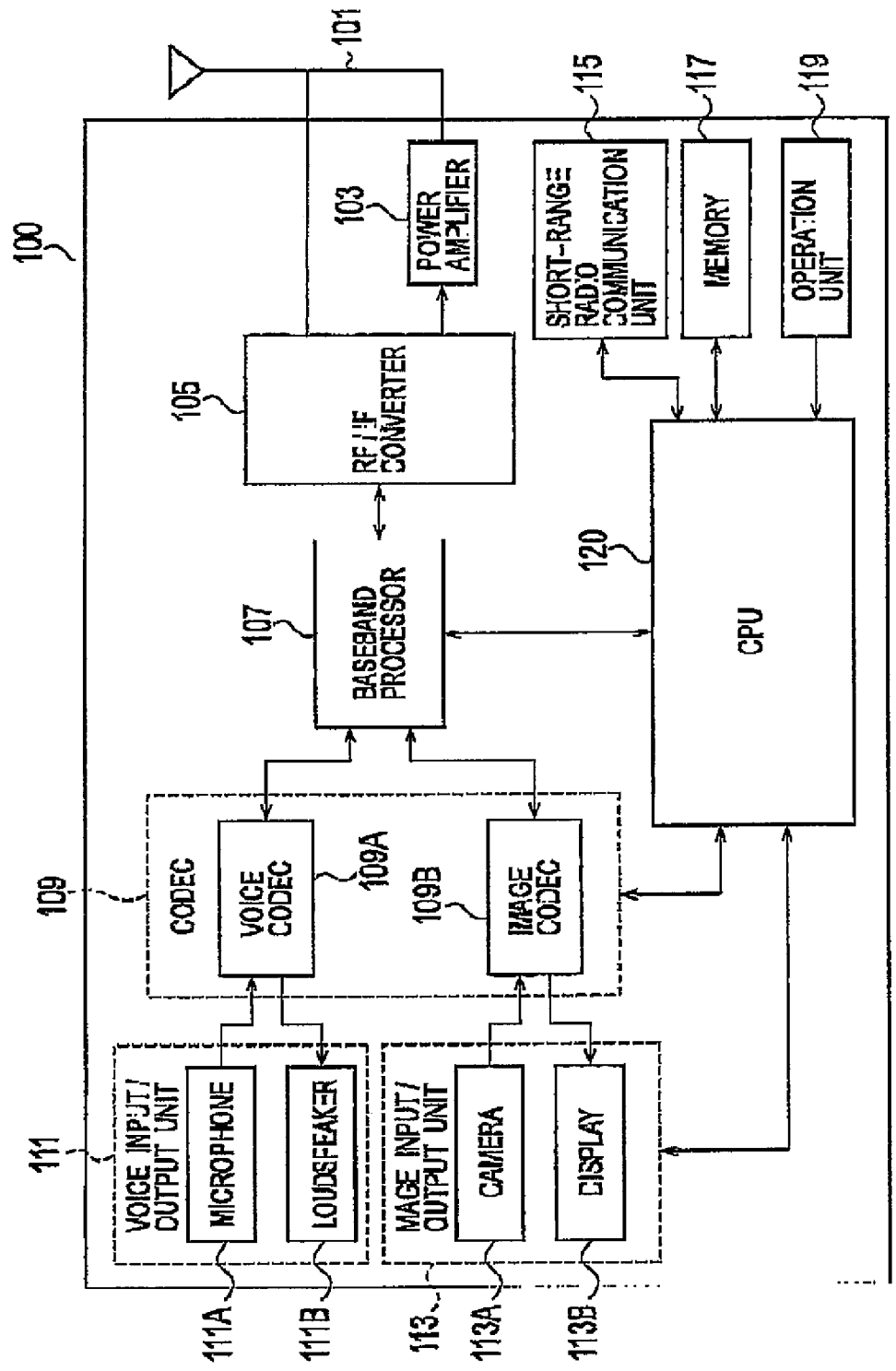
[FIG. 2]

FIG. 2 is a diagram showing the block configuration of the radio communication terminal 100. As FIG. 2 shows, the radio communication terminal 100 includes an antenna 101, a power amplifier 103, an RF/IF converter 105, a baseband processor 107, a codec 109, a voice input/output unit 111, an image input/output unit 113, a short-range radio communication unit 115, the memory 117, an operation unit 119, and a CPU 120.

The antenna 101, the power amplifier 103, the RF/IF converter 105, and the baseband processor 107 are used to perform radio communication with the radio base station 10a.

The antenna 101 transmits and receives radio signals of a predetermined frequency band. The power amplifier 103 amplifies transmission radio signals outputted from the RF/IF converter 105.

The RF/IF converter 105 performs conversion between a radio frequency (RF) and an intermediate frequency (IF). The baseband processor 107 performs operations, such as modulation, on baseband signals, according to a predetermined modulation scheme (such as PSK and QAM).

The codec 109 includes a voice codec 109A and an image codec 109B. The voice codec 109A performs encoding and decoding on voice signals, based on a predetermined voice encoding scheme (e.g., EVRC). The image codec 109B performs encoding and defending on image signals, based on a predetermined image encoding scheme (e.g., MPEG-4).

The voice input/output unit 111 includes a microphone 111A and a loudspeaker 111B. The voice input/output unit 111 is connected to the voice codec 109A. The image input/output unit 113 includes a camera 113A and a display 113B. The image input/output unit 113 is connected to the image codec 109B.

The short-range radio communication unit 115 performs radio communication using a wireless LAN according to IEEE802.11g or the like. Specifically, the short-range radio communication unit 115 is capable of performing radio communication with any of the radio base station 20a and the radio base station 21a.

The memory 117 stores various programs executed by the CPU 120, information registered by the user, and the like. Moreover, the memory 117 stores information on the radio communication network to which the radio communication terminal 100 is currently being connected.

FIG. 5(a) is a schematic diagram showing the internal configuration of the memory 117. As FIG. 5(a) shows, the memory 117 includes a storage unit $117_1$ and a storage unit $117_2$. As FIG. 5(b) shows, the PRL list L1 (first connection information) is stored in the storage unit $117_1$. The PRL list L1 is used for connection to the radio communication network 10 and the radio communication network 20. Specifically, the PRL list L1 includes information on the radio communication network 10 and information on the radio communication network 20 which is capable of associating with the radio communication network 10 to notify the radio communication terminal 100 that the radio communication terminal 100 has received a voice call.

More specifically, with regard to the radio communication network 20, information on wireless LAN standards and channels are recorded in an Acquisition Record constituting the PRL list L1. Further, information on an SSID and authentication of the wireless LAN (such as WEP and WPA) is recorded in a System Record.

Only the communication provider OP can rewrite the contents of the PRL list L1. In other words, the user of the radio communication terminal 100 cannot rewrite the contents of the PRL list L1. In the present embodiment, the storage unit $117_1$ constitutes a first storage unit.

The user registration list L2 (second connection information) is stored in the storage unit $117_2$. The user registration list L2 is used for connection to the radio communication network 21. Specifically, information on standards, an SSID, and authentication of the wireless LAN (e.g., WEP and WPA) is recorded in the user registration list L2.

The user of the radio communication terminal 100 can rewrite the contents of the user registration list L2. In the present embodiment, the storage unit $117_2$ constitutes a second storage unit.

The operation unit 119 is a group of keys, including input keys for inputting letters and numbers, a call request key, an answer key for answering a call (incoming call), and other keys. When any of the keys is pressed, the operation unit 119 outputs a signal corresponding to the pressed key, to the CPU 120.

The CPU 120 is connected to each of the blocks: the baseband processor 107, the codec 109, the image input/output unit 113, the short-range radio communication unit 115, the memory 117, and the operation unit 119. By executing the programs stored in the memory 117, the CPU 120 performs operations such as transmission and reception of data to and from the blocks and control of the blocks.

Particularly, in the present embodiment, the CPU 120 selects either the radio communication network 20 or the radio communication network 21 based on the PRL list L1 stored in the storage unit $117_1$ of the memory 117, and the user registration list L2 stored in the storage unit $117_2$ of the memory 117 (see FIG. 5(a)). In the present embodiment, the CPU 120 constitutes a network controller.

Moreover, in the present embodiment, the CPU 120 can select the radio communication network 20 provided by the communication provider OP, in priority to the radio communication network 21 registered by the user of the radio communication terminal 100.

Specifically, the CPU 120 performs processing for connection to the radio communication network 20, based on the PRL list L1 stored in the storage unit $117_1$.

When determined that the radio communication terminal 100 is not connectable to the radio communication network 20, the CPU 120 performs processing for connection to the radio communication network 21. Specifically, the CPU 120 determines whether the radio communication terminal 100 is connectable to the radio communication network 20 or not, based on the received signal strength (RSSI) of a radio signal transmitted from the radio base station 20a.

Even, after the determination that the radio communication terminal 100 is not connectable to the radio communication network 20, the CPU 120 performs the processing for connection to the radio communication network 20 at a predetermined cycle (e.g., per 10 seconds). Specifically, the CPU 120 determines whether or not the radio communication terminal 100 can receive radio signals transmitted by the radio base station 20a. If a received radio signal has an RSSI of a predetermined threshold or more, the CPU 120 performs processing for setting up a service set identifier (SSID), a WEP key, and the like with the radio base station 20a.

When determined that the radio communication terminal 100 is connectable to the radio communication network 20, the CPU 120 stops the processing for connection to the radio communication network 21. In other words, the CPU 120 repeats the processing for connection to the radio communication network 20 and the processing for connection to the radio communication network 21 at the predetermined cycle while the radio communication terminal 100 is connectable to neither the radio communication network 20 nor the radio communication network 21. When determined that the radio communication terminal 100 is connectable to the radio communication network 20 before it is to the radio communication network 21, the CPU 120 stops the processing for connection to the radio communication network 21, which has been repeated at the predetermined cycle.

Further, when determined that the radio communication terminal 100 is not connectable to the radio communication network 20, the CPU 120 may perform processing for connection to the radio communication network 10 provided by the communication provider OP. Specifically, the CPU 120 determines whether or not the radio communication terminal 100 can receive a paging channel transmitted by the radio base station 10a at a predetermined cycle (e.g., 8.12 seconds). When received the paging channel, the CPU 120 performs operations, such as set-up for a communication channel, with the radio base station 10a.

Further, when determined that the radio communication terminal 100 is connectable to the radio communication network 20, the CPU 120 stops the processing for connection to the radio communication network 10. In other words, the CPU 120 repeats the processing for connection to the radio communication network 20 and the processing for connection to the radio communication network 10 at the predetermined cycle while the radio communication terminal 100 is connectable to neither the radio communication network 20 nor the radio communication network 10. When determined that the radio communication terminal 100 is connectable to the radio communication network 20 before it is to the radio communication network 10, the CPU 120 stops the processing for connection to the radio communication network 10, which has been repeated at the predetermined cycle.

Note that the CPU 120 may repeat the processing for connection to the radio communication network 10 and the processing for connection to the radio communication network 21 at the predetermined cycle when determined that the radio communication terminal 100 is not connectable to the radio communication network 20.

(Operations of the Communication System)

Next, operations of the communication system 1 described above will be described. Specifically, a description will be given of an operation example of how the radio communication terminal 100 selects a radio communication network (a roaming operation).

Note that the description below expresses the radio communication network 10, the radio communication network 20, and the radio communication network 21 as follows.

The radio communication network 10: a line switching network

The radio communication network 20: a communication provider-provided WLAN

The radio communication network 21: a user-registered WLAN (1) OPERATION EXAMPLE 1

Figure 3:
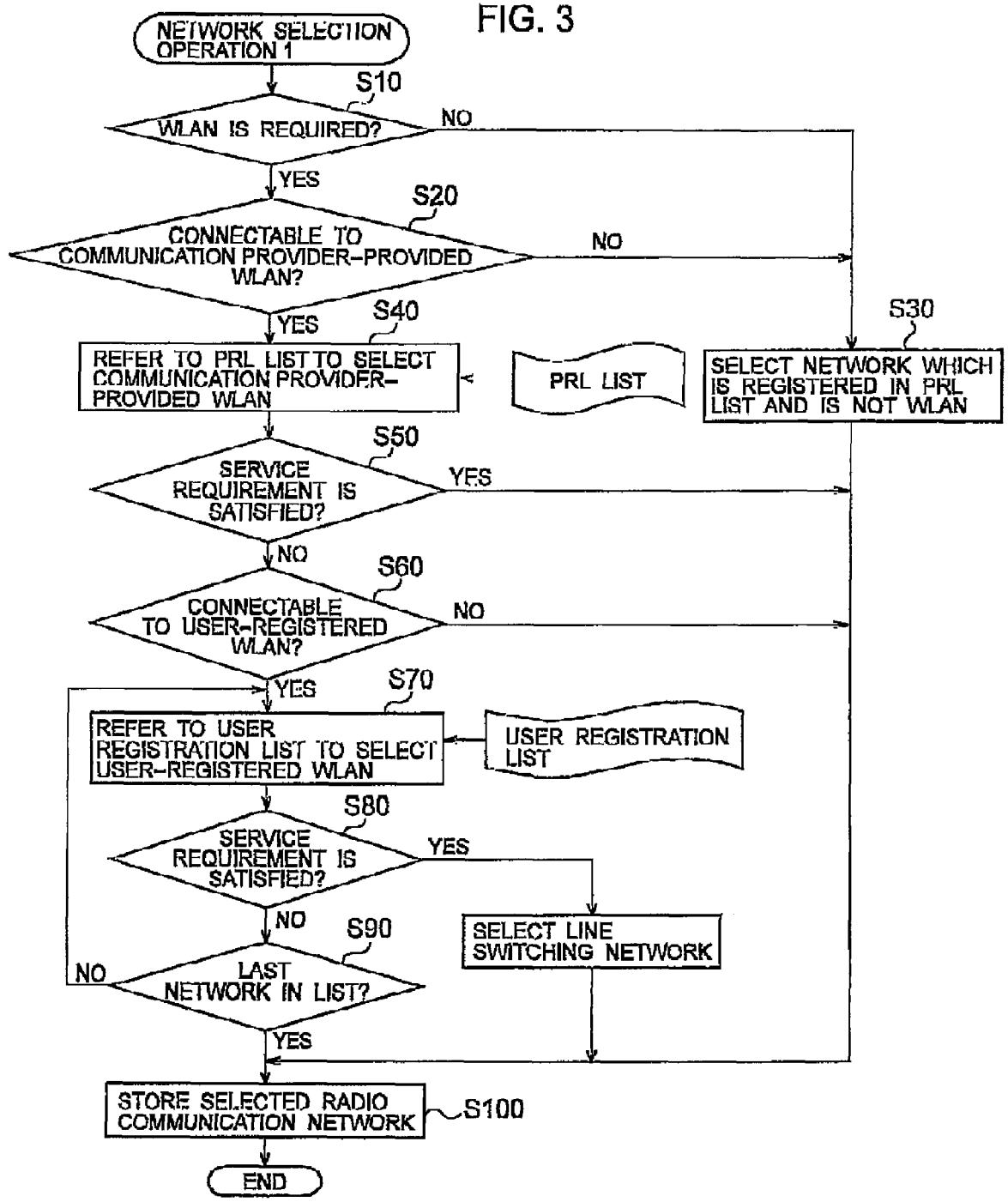
[FIG. 3]

FIG. 3 shows an operation example of how the radio communication terminal 100 selects a radio communication network. As FIG. 3 shows, in Step S10, the radio communication terminal 100 determines whether a wireless LAN (WLAN) is required or not. For example, the radio communication terminal 100 determines the requirement of a wireless LAN, based on a communication speed required by an application (e.g., IP-TV phone).

When determined that a wireless LAN is required (YES in Step S10), in Step S20 the radio communication terminal 100 determines whether the radio communication terminal 100 is connectable to the communication provider-provided WLAN or not. Specifically, the radio communication terminal 100 determines whether the radio communication terminal 100 is connectable to the radio communication network 20 or not, based on the received signal strength (RSSI) of a radio signal transmitted by the radio base station 20a. When determined that a wireless LAN is not required (NO in step S10), in Step S30 the radio communication terminal 100 selects a network which is described in the PRL list L1 (see FIG. 5(b)), not a wireless LAN, and capable of notifying the radio communication terminal 100 of a voice call reception. For example, the line switching network is selected here. Specifically, the radio communication terminal 100 performs operations, such as set-up of a communication channel, with the radio base station 10a.

When connectable to the communication provider-provided WLAN (YES in Step S20), in Step S40 the radio communication terminal 100 refers to the PRL list L1 to select the communication provider-provided WLAN. Specifically, the radio communication terminal 100 sets up a service set identifier (SSID), a WEP key, and the like, with the radio base station 20a.

In Step S50, the radio communication terminal 100 determines whether a service requirement (communication speed) required by the application is satisfied or not.

When the service requirement required by the application is not satisfied (NO in Step S50), in Step S60 the radio communication terminal 100 determines whether the radio communication terminal 100 is connectable to the user-registered WLAN or not. Specifically, the radio communication terminal 100 determines whether the radio communication terminal 100 is connectable to the radio communication network 21 or not, based on the received signal strength (RSSI) of a radio signal transmitted by the radio base station 21a.

When connectable to the user-registered WLAN (YES in Step S60), in Step S70 the radio communication terminal 100 refers to the user registration list L2 (see FIG. 5(b)) to select the user-registered WLAN. Specifically, the radio communication terminal 100 sets up a service set identifier (SSID), a WEP key, and the like, with the radio base station 21a.

In Step S80, the radio communication terminal 100 determines whether the service requirement (communication speed) required by the application is satisfied or not.

When the service requirement required by the application is not satisfied (NO in Step S80), in Step S90 the radio communication terminal 100 determines whether or not selection has been made all the way through the last network (wireless LAN) registered in the user registration list L2.

When selection has been made all the way through the last network (wireless LAN) registered in the user registration list L2 (YES in Step S90), in Step S100 the radio communication terminal 100 records the selected network (wireless LAN). Specifically, the radio communication terminal 100 stores information on the selected radio communication network in the memory 117.

Also when the service requirement required by the application is satisfied (YES in Step S50) and when the radio communication terminal 100 selects the line switching network (in Step S30), the radio communication terminal 100 stores information on the selected radio communication network in the memory 117.

When selecting the wireless LAN by referring to the user registration list L2 (YES in Step S60), the radio communication terminal 100 also selects the line switching network in order to be notified of reception of a voice call. Further, the radio communication terminal 100 stores information on the selected radio communication network in the memory 117.

(2) OPERATION EXAMPLE 2

Figure 4:
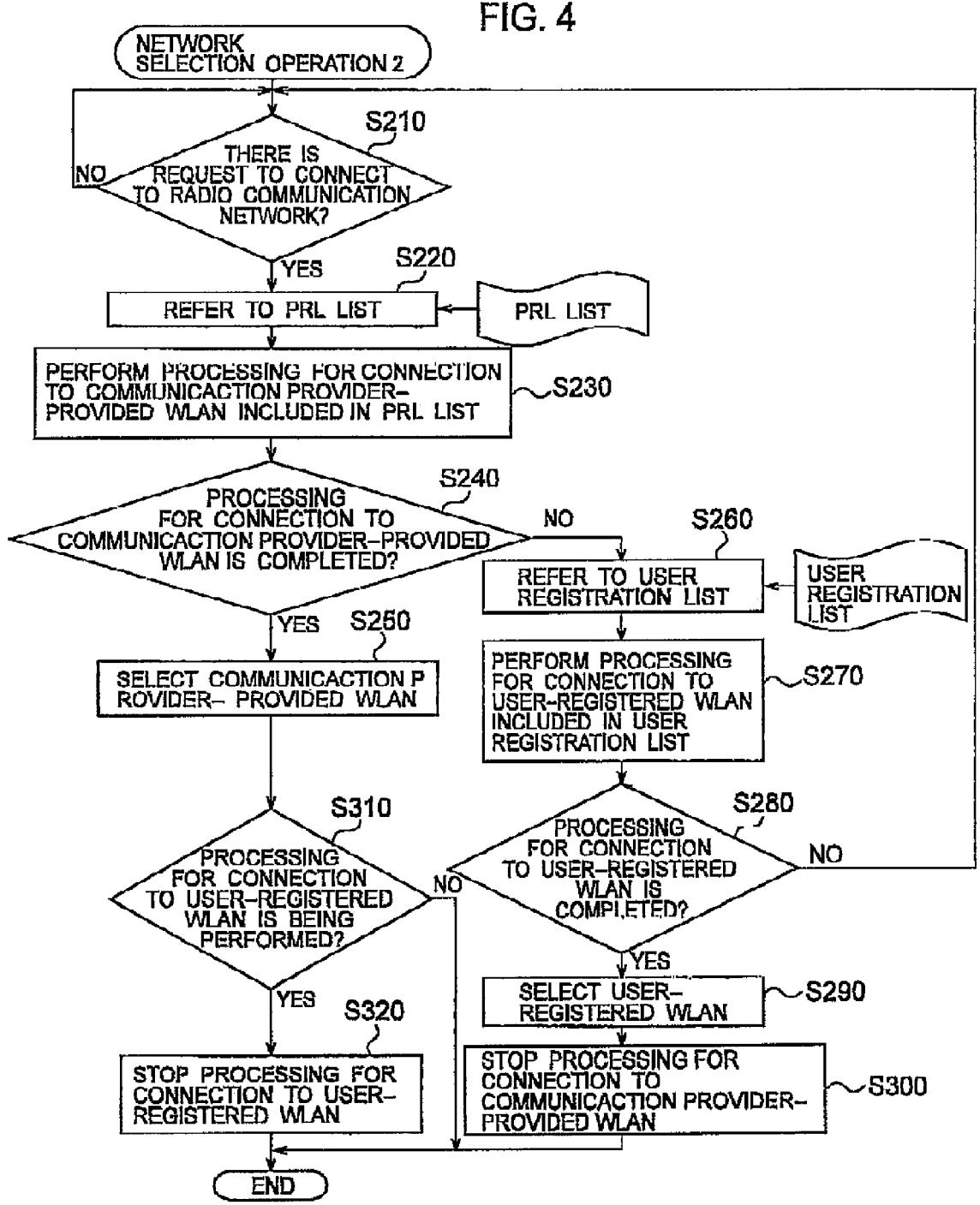
[FIG. 4]

FIG. 4 shows another operation example of how the radio communication terminal 100 selects a radio communication network. As FIG. 4 shows, in Step S210, the radio communication terminal 100 determines whether there is a request to connect to a radio communication network or not. For example, the radio communication terminal 100 determines whether there is a request to connect to a radio communication network or not, which request is made when the user wishes to start using a voice call service.

When there is a request to connect to a radio communication network (YES in Step S210), in Step S220 the radio communication terminal 100 refers to the PL list L1 (see FIG. 5(b)).

In Step S230, the radio communication terminal 100 performs processing for connection to a communication provider-provided WLAN included in the PRL list L1. Specifically, the radio communication terminal 100 determines whether the radio communication terminal 100 is connectable to the radio communication network 20 or not, based on the received signal strength (RSSI) of a radio signal transmitted by the radio base station 20a. When the RSSI is not lower than a predetermined threshold, the radio communication terminal 100 sets up a service set identifier (SSID), a WEP key, and the like, with the radio base station 20a.

In Step S240, the radio communication terminal 100 determines whether the processing for connection to the communication provider-provided WLAN is completed or not.

When the processing for connection to the communication provider provided WLAN is completed (YES in Step S240), in Step S250 the radio communication terminal 100 selects the communication provider-provided WLAN and receives communication services, such as a voice call service, provided by the communication provider-provided WLAN.

When the processing for connection to the communication provider-provided WLAN is not completed (NO in step S240), in Step S260 the radio communication terminal 100 refers to the user registration list L2 (see FIG. 5(b)). The connection processing is determined as incomplete when, for example, the received signal strength (RSSI) of a radio signal transmitted by the radio base station 20a is below the predetermined threshold.

In Step S270, the radio communication terminal 100 performs processing for connection to a user-registration WLAN included in the user registration list L2. Specifically, the radio communication terminal 100 determines whether the radio communication terminal 100 is connectable to the radio communication network 21 or not, based on the received signal strength (RSSI) of a radio signal transmitted by the radio base station 21a. When the RSSI is not lower than the predetermined threshold, the radio communication terminal 100 sets up a service set identifier (SSID), a WEP key, and the like, with the radio base station 21a.

In Step S280, the radio communication terminal 100 determines whether the processing for connection to the user-registered WLAN included in the user registration list L2 is completed or not.

When the processing for connection to the user-registered WLAN is completed (YES in Step S280), in Step S290 the radio communication terminal 100 selects the user-registered WLAN and receives communication services provided by the user-registered WLAN.

When the processing for connection to the user-registered WLAN is not completed (NO in Step S280), the radio communication terminal 100 repeats the processing from Step S210.

In Step S300, the radio communication terminal 100 stops the processing for connection to the communication provider-provided WLAN. In addition, in Step S300, the radio communication terminal 100 may connect to the line switching network so as to receive notification of a voice call reception.

In Step S310, the radio communication terminal 100 determines whether the processing for connection to the user-registered WLAN is being performed.

When the processing for connection to the user-registered WLAN is being performed (YES in Step S310), in Step S320 the radio communication terminal 100 stops the processing for connection to the user-registered WLAN. In other words, when any one of the processing for connection to the communication provider-provided WLAN (radio communication network 20) and the processing for connection to the user-registered WLAN (radio communication network 21) is completed and the corresponding radio communication network is selected, the radio communication terminal 100 stops the processing for connection to the other radio communication network.

(Advantageous Effects)

According to the radio communication terminal 100, the PRL list L1 used for connection to the communication provider-provided WLAN (radio communication network 20) provided by the communication provider OP is stored in the storage unit $117_1$, the contents of which is rewritable by the communication provider OP. On the other hand, the user registration list L2 used for connection to the user-registered WLAN (radio communication network 21) registered by a user of the radio communication terminal 100 is stored in the storage unit $117_2$, which is rewritable by the user.

Accordingly, even if the contents of the PRL list L1 are rewrote by the communication provider OP, the contents of the user registration list L2 used for connection to the user-registered WLAN registered by the user of the radio communication terminal 100 are not deleted. Therefore, the radio communication terminal 100 allows efficient management of the PRL list L1 provided by the communication provider OP and the user registration list L2 to which addition is made by the user.

In the present embodiment, the communication provider-provided WLAN (radio communication network 20) can notify the radio communication terminal 100 of reception of a voice call for the radio communication terminal 100. Further, the radio communication terminal 100 (CPU 120) can select the communication provider-provided WLAN in priority to the user-registered WLAN (radio communication network 21). Accordingly, it is the PRL list L1 that includes information used for connection to the communication provider-provided WLAN capable of notifying the radio communication terminal 100 of a voice call reception.

Therefore, the PRL list L1 can include both information used for connection to the line switching network (radio communication network 10) and information used for connection to the communication provider-provided WLAN which is capable of associating with the line switching network. Consequently, by rewriting the contents of the PRL list L1, the communication provider OP can manage easily and certainly information used for connection to the line switching network and information used for connection to the communication provider-provided WLAN capable of associating with the line switching network.

In the present embodiment, when determined that the radio communication terminal 100 is not connectable to the communication provider-provided WLAN, the radio communication terminal 100 can perform the processing for connection to the user-registered WLAN and/or the processing for connection to the line switching network. Accordingly, even when not connectable to the communication provider-provided WLAN, the radio communication terminal 100 can perform radio communication by using a connectable radio communication network. Further, the radio communication terminal 100 can be notified of reception of a voice call (e.g., a voice call provided via a radio communication network employing a cdma2000 1× scheme).

Furthermore, the radio communication terminal 100 repeats the processing for connection to the radio communication network 20 at the predetermined cycle (e.g., per 10 seconds) even after determined that the radio communication terminal 100 is not connectable to the radio communication network 20. When determined that the radio communication terminal 100 is connectable to the radio communication network 20 during the repetition of the connection processing, the radio communication terminal 100 stops the processing for connection to the other radio communication network (e.g., the radio communication network 21). This prevents power consumption which would be caused if the processing for connection to the other radio communication network were repeated even after the radio communication terminal 100 is connected to the radio communication network 20.

(Other Embodiments)

The contents of the present invention have been disclosed as above by use of one embodiment of the present invention. It should be understood, however, that the descriptions and drawings constituting a part of the disclosure do not limit the present invention. This disclosure will make various alternative embodiments apparent to those skilled in the art.

For example, in the above-described embodiment, when determined that the radio communication terminal 100 is connectable to the radio communication network 20, the radio communication terminal 100 stops the processing for connection to the other radio communication network. However, the radio communication terminal 100 does not have to stop the connection processing. Moreover, in the above-described embodiment, when determined that the radio communication terminal 100 is not connectable to the communication provider-provided WLAN, the radio communication terminal 100 performs the processing for connection to the user-registered WLAN or the processing for connection to the line switching network. However, the radio communication terminal 100 does not necessarily have to perform such processing.

In the above-described embodiment, the radio communication network 10 is the radio communication network 10. However, instead of the radio communication network 10, a packet switching radio communication network employing a cdma2000 1×-EVDO scheme or the like may be used.

The above-described embodiment is described by taking a wireless LAN as an example. However, instead of the wireless LAN, a radio communication network conforming to IEEE802.16e (mobile WiMAX) may be used.

As described, the present invention of course includes various embodiments and the like that are not described herein. Therefore, the technical scope of the present invention should be defined by the specified matters in the present invention according to the claims reasonable from the above description.

Note that the entire contents of Japanese Patent Application No. 2006-322676 (filed on Nov. 29, 2006) are incorporated herein by reference.

Industrial Applicability

As described above, the radio communication terminal according to the present invention can efficiently manage information (PRL) used for connection to a radio communication network provided by a communication provider and information on a radio communication network which is added by a user. Accordingly, the radio communication terminal according to the present invention is effective for radio communication such as mobile communication.

The invention claimed is:

1. A radio communication terminal capable of selectively using a plurality of radio communication networks, depending on a requirement, the radio communication terminal comprising:
    a first storage unit configured to store first connection information used for connection to a communication provider-provided network being one of the radio communication networks provided by a communication provider, a content of the first storage unit being rewritable by the communication provider;
    a second storage unit configured to store second connection information used for connection to a user-registered network being one of the radio communication networks provided by other than the communication provider and registered by a user of the radio communication terminal, the second storage unit being rewritable by the user; and
    a network controller configured to select any one of the communication provider-provided network and the user-registered network based on the first connection information stored in the first storage unit, and the second connection information stored in the second storage unit, wherein
    the network controller performs processing for connection to the communication provider-provided network, based on the first connection information stored in the first storage unit, and
    when determined that the radio communication terminal is not connectable to the communication provider-provided network, the network controller performs processing for connection to the user-registered network.

2. The radio communication terminal according to claim 1, wherein
    the network controller performs the processing for connection to the communication provider-provided network at a predetermined cycle, and when determined that the radio communication terminal is connectable to the communication provider-provided network, the network controller stops the processing for connection to the user-registered network.

3. A radio communication terminal capable of selectively using a plurality of radio communication networks, depending on a requirement, the radio communication terminal comprising:
- a first storage unit configured to store first connection information used for connection to a communication provider-provided network being one of the radio communication networks provided by a communication provider, a content of the first storage unit being rewritable by the communication provider;
- a second storage unit configured to store second connection information used for connection to a user-registered network being one of the radio communication networks provided by other than the communication provider and registered by a user of the radio communication terminal, the second storage unit being rewritable by the user; and
- a network controller configured to select any one of the communication provider-provided network and the user-registered network based on the first connection information stored in the first storage unit, and the second connection information stored in the second storage unit, wherein the network controller performs processing for connection to the communication provider-provided network, based on the first connection information stored in the first storage unit, and when determined that the radio communication terminal is not connectable to the communication provider-provided network, the network controller performs processing for connection to a communication provider-provided line switching network.

4. The radio communication terminal according to claim 3, wherein
the network controller performs the processing for connection to the communication provider-provided network at a predetermined cycle, and
when determined that the radio communication terminal is connectable to the communication provider-provided network, the network controller stops the processing for connection to the communication provider-provided line switching network.

* * * * *